(12) United States Patent
Jose et al.

(10) Patent No.: US 12,259,875 B2
(45) Date of Patent: Mar. 25, 2025

(54) KEY-BASED COMPLEX PROCESS MONITORING

(71) Applicant: Cisco Technology, Inc., San Jose, CA (US)

(72) Inventors: Tom Thekkel Jose, Sunnyvale, CA (US); Jaideep Padhye, San Jose, CA (US); Anna E. Min, Emeryville, CA (US); John Solomon Jebamani Asirvatham, Newark, CA (US); Ashwin Jayaprakash, Sunnyvale, CA (US); Venkata Rama Rajesh Gudivada, Leander, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/226,030

(22) Filed: Jul. 25, 2023

(65) Prior Publication Data
US 2025/0036613 A1 Jan. 30, 2025

(51) Int. Cl.
*G06F 7/00* (2006.01)
*G06F 16/23* (2019.01)

(52) U.S. Cl.
CPC .............................. *G06F 16/2379* (2019.01)

(58) Field of Classification Search
CPC .................................................. G06F 16/2379
USPC ................................................. 707/600–899
See application file for complete search history.

(56) References Cited

U.S. PATENT DOCUMENTS

| | | |
|---|---|---|
| 8,121,877 B2 | 2/2012 | Chang et al. |
| 9,832,205 B2 | 11/2017 | Santhi et al. |
| 2004/0078105 A1 | 4/2004 | Moon et al. |
| 2007/0179823 A1 | 8/2007 | Bhaskaran et al. |
| 2020/0226117 A1* | 7/2020 | Mutalik Desai ...... G06F 16/212 |

OTHER PUBLICATIONS

Niwas, Sandeep, "Business Journeys: Monitoring Complex Business Workflows", Nov. 6, 2017, 3 pages, AppDynamics Blog.

(Continued)

*Primary Examiner* — Isaac M Woo
(74) *Attorney, Agent, or Firm* — BEHMKE INNOVATION GROUP LLC; James M. Behmke; James J. Wong

(57) ABSTRACT

In one embodiment, a device receives, via a user interface, definition of a first sequence of transactional milestones performed by users of an online application and identified using a first type of identifier. The device also receives, via the user interface, definition of a second sequence of transactional milestones performed by users of the online application and identified using a second type of identifier. The device further receives, via the user interface, definition of a key transition associated with at least one transactional milestone in the first sequence of transactional milestones or second sequence of transactional milestones that links the first type of identifier with the second type of identifier. The device represents, using the key transition, performance of the first sequence of transactional milestones and the second sequence of transactional milestones by a particular user of the online application as a unified sequence.

20 Claims, 10 Drawing Sheets

(56) References Cited

OTHER PUBLICATIONS

"Correlate traces to track Business Workflows", online: https://docs.splunk.com/observability/apm/workflows/workflows.html#nav-Correlate-traces-to-track-Business-Workflows, accessed Jul. 25, 2023, 2 pages, Splunk, Inc.

"Analyze Data Using SignalFlow", online: https://dev.splunk.com/observability/docs/signalflow/, accessed Jul. 25, 2023, 22 pages, Splunk, Inc.

Kaiser, Gary, "Dynatrace enhances Business Analytics with business events powered by Grail", online: https://www.dynatrace.com/news/blog/dynatrace-enhances-business analytics/, accessed Jul. 25, 2023, 10 pages, Dynatrace LLC.

"DQL matcher in business events", online: https://www.dynatrace.com/support/help/platform-modules/business-analytics/ba-events-processing/ba-events-processing-matcher, accessed Jul. 25, 2023, 7 pages, Dynatrace LLC.

"Real-Time Business Intelligence", online: https://www.datadoghq.com/solutions/real-time-business-intelligence/, accessed Jul. 25, 2023, 7 pages, Datadog.

\* cited by examiner

KEY-BASED COMPLEX PROCESS MONITORING

TECHNICAL FIELD

The present disclosure relates generally to computer systems, and, more particularly, to key-based complex process monitoring.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

Increasingly, executing processes (e.g., series of tasks, set of activities, business processes, etc.) involves a combination of multiple applications, services, or events. However, end-to-end monitoring and analysis across these distributed processes is needed to properly evaluate the workflow execution and/or process success. Available analytics tools often fail to accurately monitor workflows as they transit across sources in complex and/or distributed process executions. For example, as a complex workflow is executed across a variety of applications, services, events, etc., the differential handling of the workflow at each milestone may obfuscate its identity causing associated monitoring operations to fail. Similarly, repeating instances of workflows can obfuscate their identity causing associated monitoring operations to fail. As such, existing analytics tools are primarily limited to monitoring non-repeating workflows within non-complex processes that utilize homogenous workflow handling across the entire process.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives, via a user interface, definition of a first sequence of transactional milestones performed by users of an online application and identified using a first type of identifier. The device also receives, via the user interface, definition of a second sequence of transactional milestones performed by users of the online application and identified using a second type of identifier. The device further receives, via the user interface, definition of a key transition associated with at least one transactional milestone in the first sequence of transactional milestones or second sequence of transactional milestones that links the first type of identifier with the second type of identifier. The device represents, using the key transition, performance of the first sequence of transactional milestones and the second sequence of transactional milestones by a particular user of the online application as a unified sequence.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
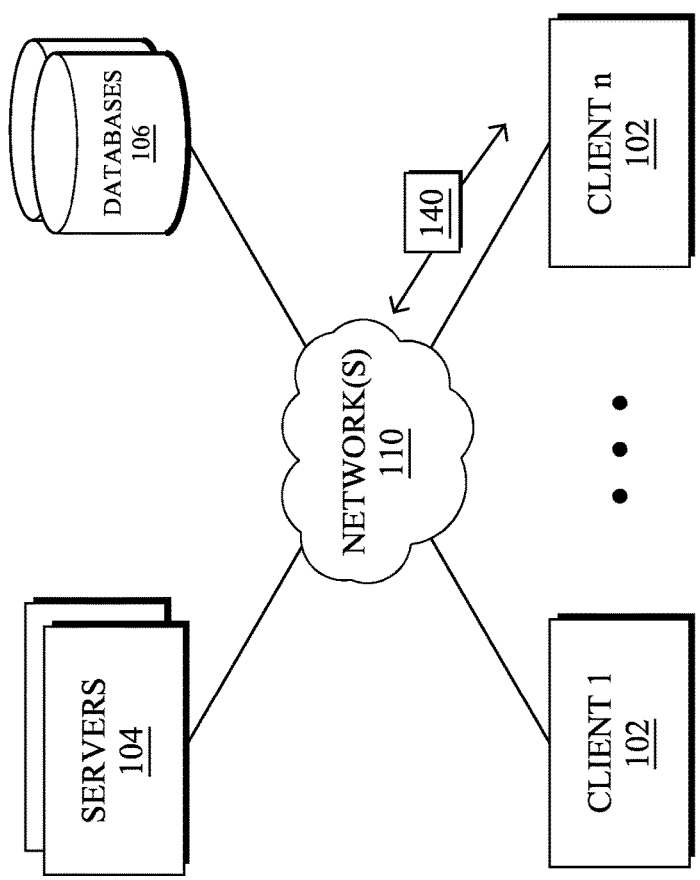
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
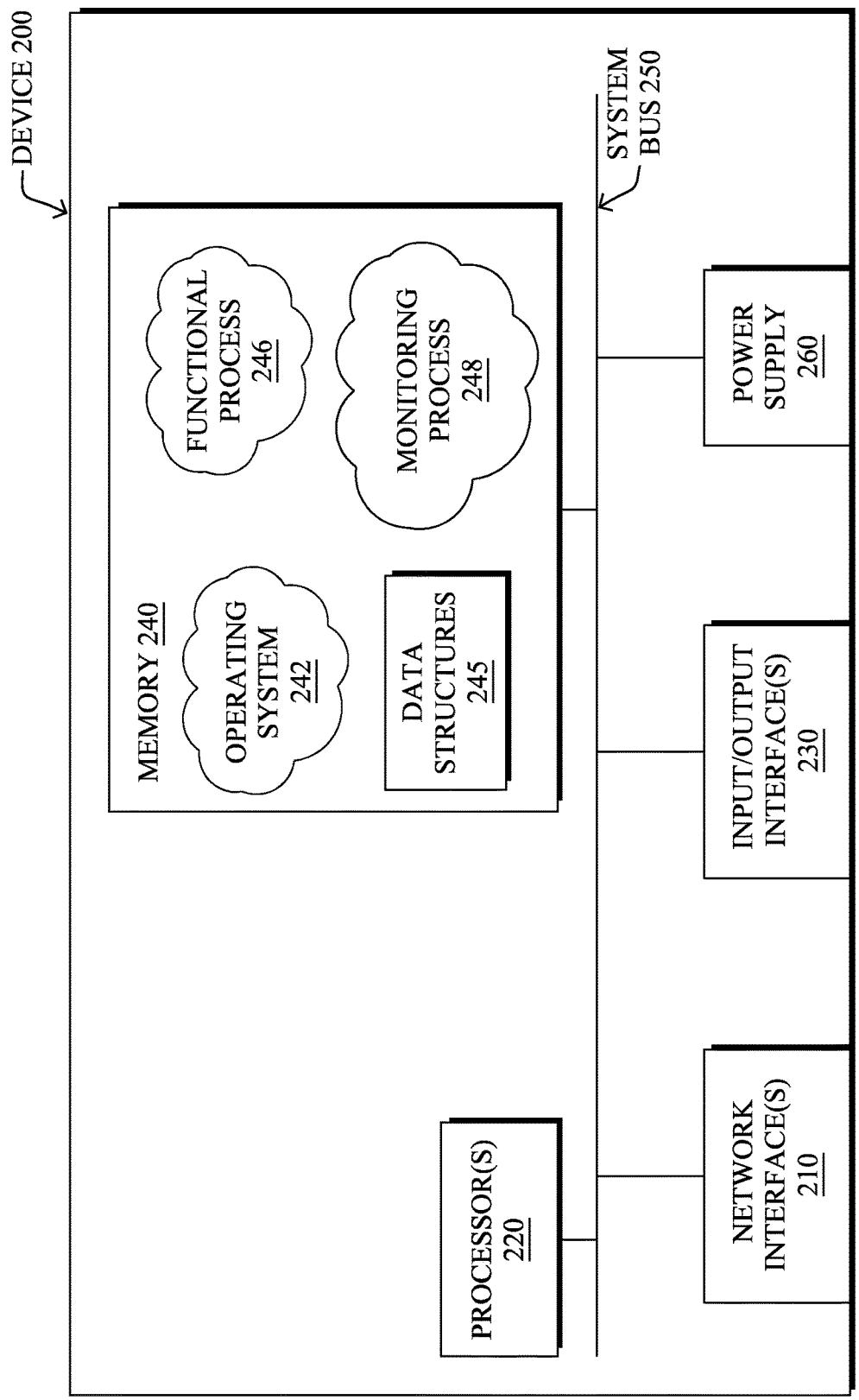
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative monitoring process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Observability Intelligence Platform——

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicates the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
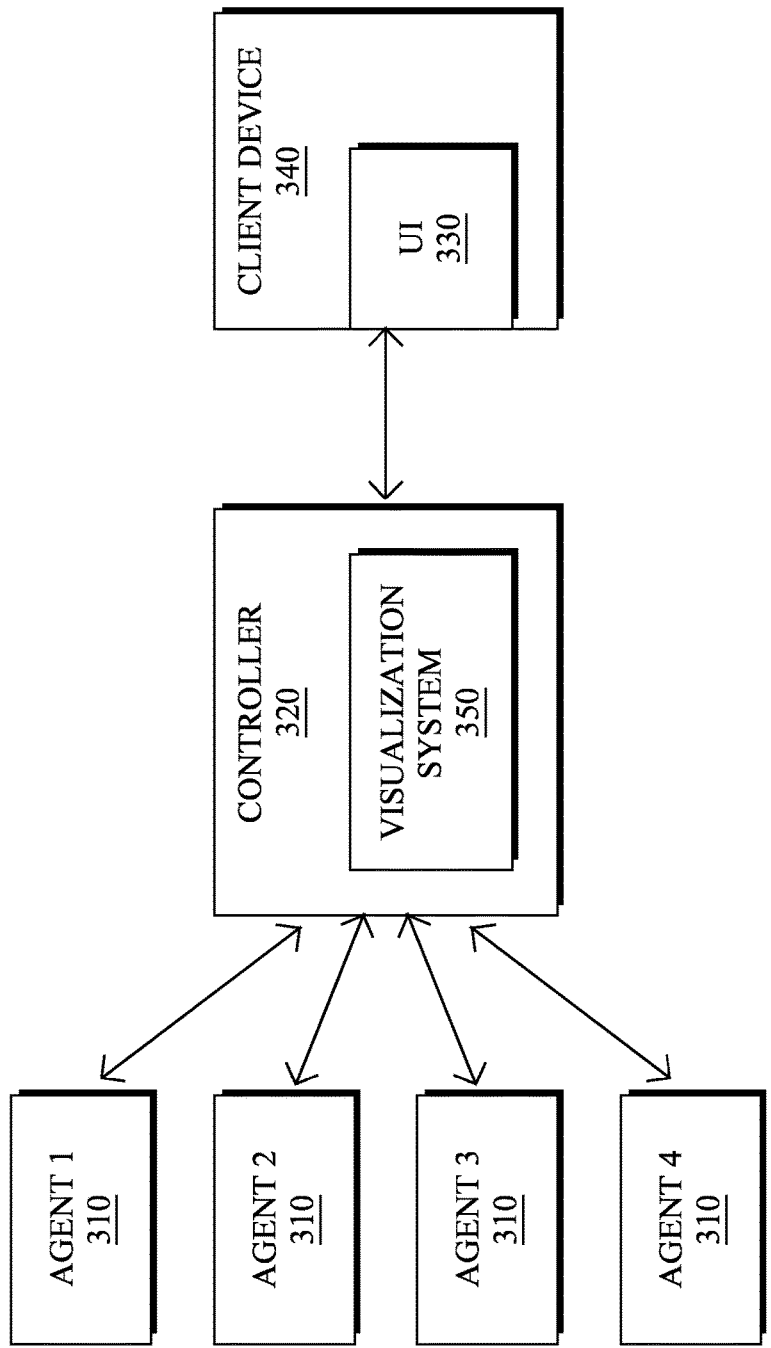
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller 320 instance may be hosted remotely by a provider of the observability intelligence platform 300. In an illustrative on-premises (On-Prem) implementation, a controller 320 instance may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

——Monitoring Complex Processes with Repeating Instances——

As noted above, existing analytics tools are primarily limited to monitoring non-repeating workflows within non-complex processes that utilize homogenous workflow handling across the entire process. When one of these tools attempts to monitor a process with additional complexity, such as one that involves repeating instances, they lose the ability to differentiate between the instances and fail to capture accurate analytics of events for each instance across the process.

In contrast, the techniques herein introduce a mechanism for accurately tracking business processes that repeat over time and use the same set of key values. These techniques can be utilized to provide end-to-end process monitoring with granularity to discern and track analytics for repeating instances of a workflow whose identity may otherwise be lost during tracking by virtue of identical key usage across executions of the process. As a result, application performance metrics and/or business metrics can be identified, analyzed, and reported even within a process that repeats over time with the same set of keys.

Illustratively, the techniques described herein may be performed by hardware, software, and/or firmware, such as in accordance with monitoring process 248, which may include computer executable instructions executed by the processor 220 (or independent processor of interfaces 210) to perform functions relating to the techniques described herein.

Specifically, and according to various embodiments, a device receives, via a user interface, definition of a first sequence of transactional milestones performed by users of an online application and identified using a first type of identifier. The device also receives, via the user interface, definition of a second sequence of transactional milestones performed by users of the online application and identified using a second type of identifier. The device further receives, via the user interface, definition of a key transition associated with at least one transactional milestone in the first sequence of transactional milestones or second sequence of transactional milestones that links the first type of identifier with the second type of identifier. The device represents, using the key transition, performance of the first sequence of transactional milestones and the second sequence of transactional milestones by a particular user of the online application as a unified sequence.

Figure 4:
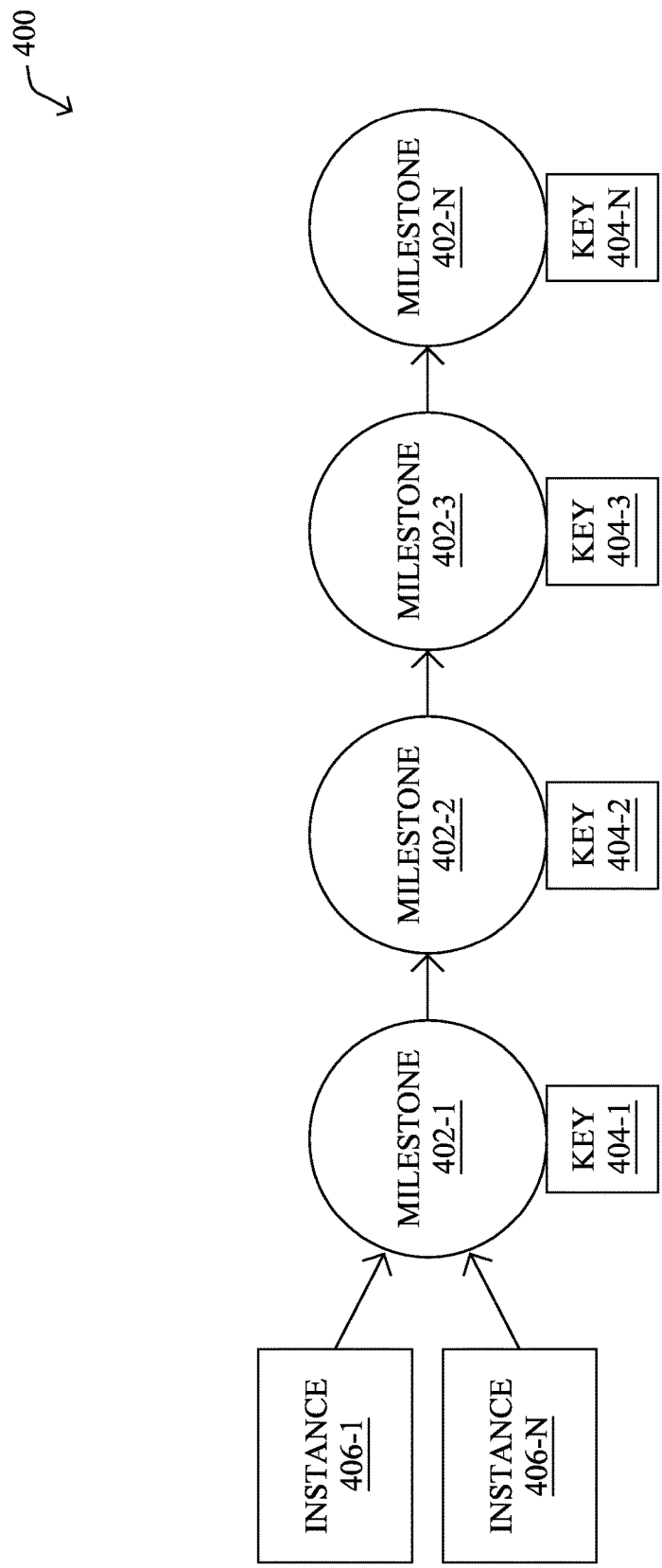
FIG. 4 illustrates an example of a process with repeating instances monitored by key-based complex process monitoring.

Operationally, FIG. 4 illustrates an example of a process 400 with repeating instances monitored by a key-based complex process monitoring platform, in accordance with one or more embodiments described herein. Process 400 may include a series of tasks, a set of activities, a business process, etc. The process 400 may include an end-to-end cross-tier processing path used to fulfill a request for a service. For example, process 400 may involve execution of a workflow such as a transaction process whose execution spans different transactions, event types, applications, services, third-party service providers, servers, data stores, etc. Examples of process 400 may include an e-commerce checkout business process, a payment transfer process, a credit card approval process, a loan submission/approval process, a mobile phone service activation/recharge process, an insurance application process through policy approval, insurance claims approval process, etc.

The process 400 may be defined by one or more milestone 402 (402-1 . . . 402-N) each made up by an event or step in executing a business workflow. Each milestone 402 may be a sequential event marking a significant stage in a workflow. For example, in an e-commerce checkout business process, the first milestone 402-1 may be a user login to the e-commerce platform. The second milestone 402-2 might be the user adding an item listed for sale on the e-commerce platform to their cart. The third milestone 402-3 may include the user adding their payment information. The fourth milestone 402-N might be the user completing the checkout process by submitting the order and the payment information for processing by the e-commerce platform. The multiple milestones 402 linked together may comprise an end-to-end holistic representation of the various stages of workflow execution for process 400; in this case purchasing an item from an e-commerce platform.

As customer demands for flawless services rise, application teams need to evaluate the success of their process holistically as well as the performance of each component. This includes monitoring and analyzing performance metrics associated with execution of each workflow in process 400 (e.g., by observability intelligence platform 300 of FIG. 3). Process 400 may include events from multiple analytics event types, such as logs, business transactions, custom events, and EUM data. In addition, these workflows can manifest over long periods of time and cannot be measured using single transaction monitoring alone. Instead, monitoring and analyzing the performance metrics for an entire process 400 that spans multiple applications, services, events, etc. may be accomplished by correlating linear data flows across multiple event sources to track and collect metrics for each workflow instance 406 (e.g., 406-1 . . . 406-N) of process 400.

In various embodiments, defining process 400 may involve defining a key 404 (e.g., 404-1 . . . 404-N) that spans all the milestones 402 of the process 400, thereby tying them together for monitoring purposes. This same key 404 is then shared across each of the milestones 402 and can be used as an identifier to monitor the events associated with each workflow instance 406 and their corresponding performance metrics. Therefore, the monitoring, collection, and/or analysis of performance metrics from an execution of a particular workflow instance is associated with and/or identifiable by the key 404 at each milestone.

The key 404 may be a certain type of data that is able to be identified from end-to-end of the process and typically varies from workload instance to workload instance. For example, in the previously outlined e-commerce checkout business process, a key 404 may be defined as the userID for the end user driving the workflow. The userID may represent a good candidate for key 404 as it is consistently available across milestones 402 in this example and its value is unique for each distinct user of the e-commerce platform (e.g., each user has a different userID). As such, the userID will serve as a unique key to uniquely identify each workload instance driven by a different end user of the e-commerce checkout business process.

However, the ability of key 404 to uniquely identify each workflow instance 406 of process 400 may be challenged when its actual value is not unique between each workflow instance 406. For example, a workflow instance 406 can be repeated instance of process 400. A repeated instance of process 400 may include a workflow instance 406 of process 400 that is repeated over time using the same value for key 404.

For example, returning to the e-commerce platform checkout business process example utilizing the userID as the key 404, a user may drive a first workflow instance 406-1 of process 400 by logging in to the platform, adding an item to their cart, entering their credit card information, and proceeding to check out. That user's userID value (e.g., User123) may serve as the key 404 by which the first workflow instance 406-1 of process 400 is monitored. Then, that same user may come back after a few hours or a few days and drive second workflow instance 406-N by once again logging in to the platform, adding an item to their cart, entering their credit card information, and proceeding to check out. Since the userID value of the same user is being used as the key 404 for the second workflow instance 406-N as well, that same userID value (e.g., User123) ends up being used again as the key 404 by which the second workflow instance 406-N of process 400 is monitored. Therefore, the second workflow instance 406-N is a repeat of the first workflow instance 406-1, and both instances share an identical key value.

Typically if repeating workflow instances of a process 400 are encountered by monitoring utilities using them to monitor and/or analyze the performance metrics of the process 400, then the data associated with the execution of the most recent workload instance (e.g., the second workflow instance 406-N in the example above) may be used to overwrite the existing data associated with the execution of the previous instance with the same key 404 (e.g., the first workflow instance 406-1 in the example above). That is, the second workflow instance 406-N from the example above may not be considered as and/or be processed like a new instance by a monitoring platform. This can result in incorrect processing and analysis of performance metrics since only the most recent occurrence of the process 400 is maintained in the system as corresponding to the userID value.

To prevent erroneous metric collection and/or analysis due to repeated workflow instances, an application performance data monitoring platform in accordance with one or more embodiments described herein may be configured to include a functionality that supports differentiation of repeating workflow instances that would have the same key value. This functionality may, as described in greater detail below, be implemented via a backend generating unique keys to individually track each workflow instance 406 of the process 400.

Figure 5:
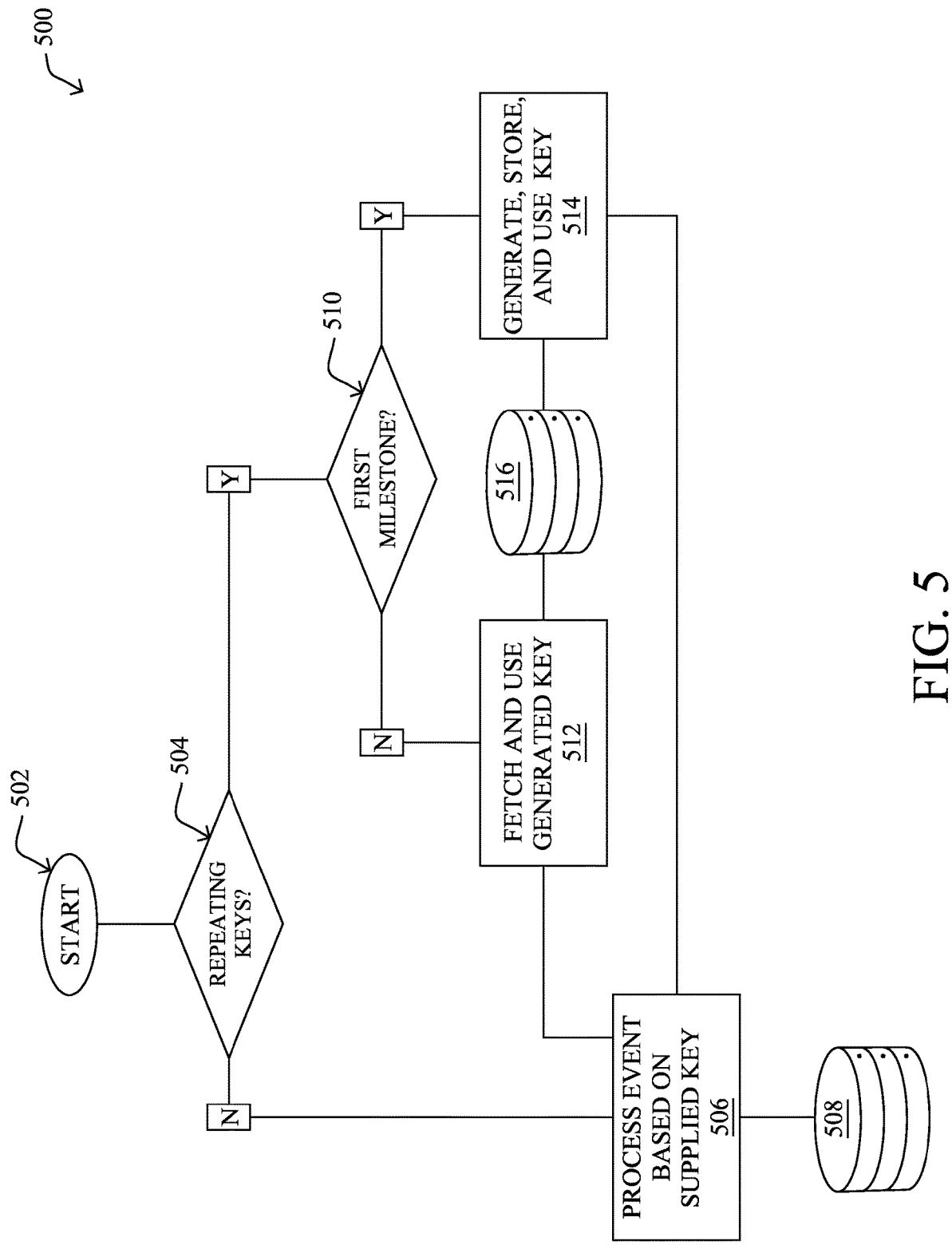
FIG. 5 illustrates an example of a process flow for key-based complex process monitoring of repeated workflow instances.

FIG. 5 illustrates an example of a process flow 500 for key-based complex process monitoring of processes with repeated workflow instances, in accordance with one or more embodiments described herein. Specifically, flow 500 illustrates an example of steering logic for an application performance monitoring platform (e.g., observability intelligence platform 300 of FIG. 3) for end-to-end monitoring of business transactions and processes which have repeating workflow instances.

For example, process flow 500 may describe operations of a feature of an application performance monitoring platform that supports mapping, monitoring, and/or analyzing of steps of a distributed process (e.g., a business transaction) that spans different transactions, event types, applications, services, third-party service providers, servers, data stores, etc. The platform may support mapping of the process which includes the ability to map (e.g., visually) the flow of transactions, interactions, dependencies, etc. across the different application components, systems, services etc. involved in delivering the specific process outcome. As outlined above, the performance monitoring platform may utilize a key to tie the different stages, steps, milestones, etc. of the process together and to identify each workload instance of the process as well as any metrics collected in association therewith.

In various embodiments, users may define the process as a composite event type based on defined workflows which can include events from multiple analytics event types, such as logs, business transactions, custom events, and EUM data, etc. For example, users may configure definitions of milestones, a key tying the milestones of the process together for monitoring purposes, a category of information to be captured with respect to each milestone, metrics to be collected, metric monitoring thresholds, etc. This definition may be utilized to monitor process progress, process timing, transactional monitoring, business metrics, key performance indicators (KPI), application performance metrics for the process, as well as to provide analytics and insights and/or to perform altering and proactive monitoring, among other application performance monitoring platform functions such as those outlined with respect to observability intelligence platform 300 of FIG. 3.

Alongside configuring the definitions for process configuration, a user may provide an indication that the process being defined may involve repeating keys. For example, while defining the process a user may be provided a selectable option (e.g., a checkbox or other selectable indicator, a UI flag, etc.) to specify if the process being defined will have repeating key occurrences. In some instances, an automated determination (e.g., based on historical data, based on characteristics defined for the process, based on the application of machine learning techniques, etc.) of whether the process may have repeating key occurrences may be made.

Flow 500 may begin at box 502. Box 502 may correspond to the detection and/or receipt of an incoming event of the defined process to the application performance monitoring platform.

At box 504, a determination may be made whether repeating keys are to be supported for the process. This determination may be automated and/or it may involve referencing the definition to determine if it supports repeating key occurrences. For instance, the application performance monitoring platform may reference whether a repeating keys flag was selected in the definition for the process.

If at box 504 it is determined that repeating keys don't need to be supported for the process, then flow 500 may proceed to box 506. At box 506, the incoming event may be processed based on the supplied key. In various embodiments, the supplied key may be the key indicated by the user in the definition and/or a key automatically generated by the application performance monitoring platform. The platform may perform its application performance monitoring functions according to the process definition. For example, the platform may monitor and/or analyze metrics of each event of a workflow instance of the process based on the specified key. The results of box 506 may be submitted to datastore 508.

Conversely, if at box 504 it is determined that repeating keys are to be supported for the process, then flow 500 may proceed to box 510. At box 510, a determination may be made whether the incoming event is a first milestone event (e.g., generated in association with a first milestone of the process). For example, the platform may determine whether the incoming event is data collected from execution of an instance at and/or for the first milestone in a sequential series of transactional milestones for the process.

If at box 510 it is determined that the incoming event is a first milestone event, then flow 500 may process to box 514. At box 514, the platform may generate, store, and/or a use a unique key for the instance of the process being monitored. For example, a backend device may generate a unique key to track each workflow instance of the process. That is, in contrast to using a key which may have repeated values across instances, such as the userID key discussed in the example above, the platform may generate an entirely unique key to be assigned to the workflow instance. For instance, rather than selecting an available key which may have repeated identical value among instances, the platform may generate and assign a key value that is not repeated in future workflow instance key assignments. In some examples, the uniqueness of the key generated by the platform may be ensured by generating the key utilizing universally unique identifier (UUID), incremental, hashing algorithm, combination of factors, random generation, hybrid approach, etc. based key generating techniques.

The unique key generated for a particular workflow instance of the process may be submitted to a distributed cache 516. At distributed cache 516, the unique key may be managed and utilized as a document id while storing it in the backend datastore. Once generated, the unique key for the particular workflow instance may be utilized as the supplied key utilized to process the event at box 506.

In addition, each subsequent event processed for the particular workflow instance may be processed utilizing the same unique key assigned to the instance after its first milestone. For example, when a subsequent event (e.g., associated with a milestone other than the first milestone) for the same particular workflow instance is detected by the platform and analyzed at box 510, a determination may be made that it is not a first milestone event and the flow 500 may proceed to box 512.

At box 512, the unique key that was assigned to the particular workflow instance upon its first milestone event (e.g., as outlined with respect to box 514) may be fetched from the distributed cache 516 where it is managed. The fetched unique key for the instance may then be utilized as the supplied key utilized to process the subsequent event of the particular workflow instance at box 506.

Implementing flow 500 within an application performance monitoring platform obviates the issues arising from the sharing of the same key among repeating workflow instances of a process. Instead, each time a new workflow instance of the same process is encountered by the platform it is assigned a new unique identifier that distinguishes it from all preceding and subsequent workflow instances of the process having received their own unique identifiers. Flow 500 introduces an elegant mechanism to identify the new workflow instances by automatically assigning each workflow instance of the process a unique key value upon its first milestone. Reaching the first milestone is something that each workflow instance will do only once. Of course, using subsequent milestones as the trigger for unique key generation and assignment is also contemplated within this disclosure.

In this manner, an application performance monitoring platform will generate unique keys to track each workflow instance that it encounters, thereby ensuring that the above discussed erroneous metric collection and/or analysis due to repeated workflow instance confusion are avoided. This approach will facilitate automated and accurate tracking of business processes that repeat over time and would otherwise have the same set of key values. As a result, complex processes with potentially repeating keys can now be accurately monitored, their computing resource and/or network resource consumption can be reduced, security risks and bugs can be identified and addressed more rapidly, and the operation of the underlying networks and devices are improved.

——Monitoring Complex Processes with Key Transitions——

As noted above, existing analytics tools are primarily limited to monitoring non-complex processes that utilize homogenous workflow handling across the process. As outlined above, the usage of cross-milestone key identifiers can be utilized to monitor the execution of a workflow instance across the process. However, some processes may include additional complexity such as involving one or more key transitions across the process. These transitions can prevent tracking of a workflow instance across all of its milestones and consequently fail to capture accurate end-to-end analytics for a workflow instance across the process.

In contrast, the techniques herein introduce a mechanism for accurately tracking business processes that involve key transitions across their milestones. These techniques can be utilized to provide end-to-end process monitoring with the ability to track analytics for instances of a workflow that might otherwise be lost among key transitions among milestones in the execution of the process. As a result, application performance metrics and business metrics for a workflow can be identified, analyzed, and reported even when the keys with which they are associated change across the process milestones.

Illustratively, the techniques described herein may be performed by hardware, software, and/or firmware, such as in accordance with monitoring process 248, which may include computer executable instructions executed by the processor 220 (or independent processor of interfaces 210) to perform functions relating to the techniques described herein.

Figure 6A:
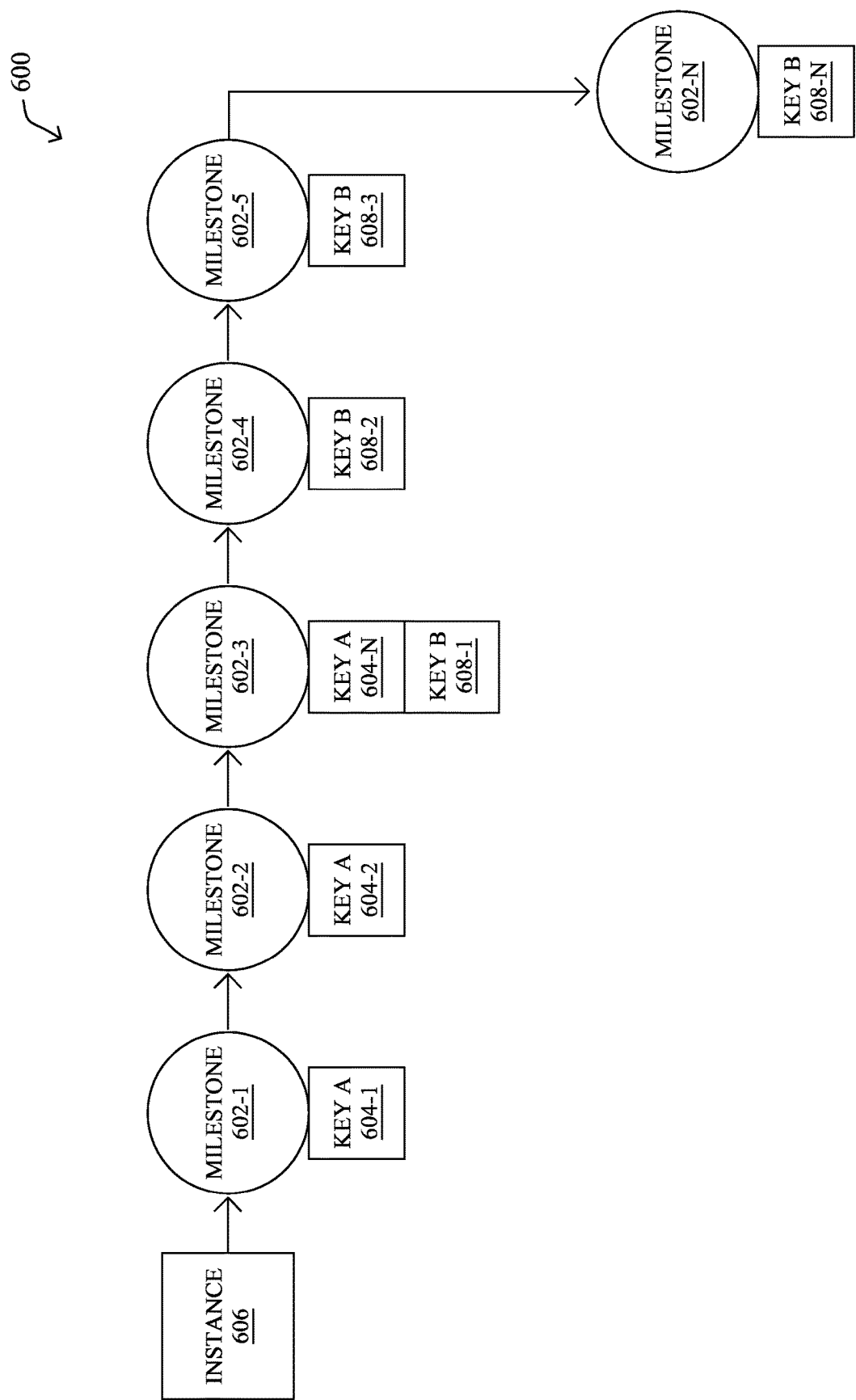
FIGS. 6A-6B illustrate an example of a process with key transitions monitored by key-based complex process monitoring.
Figure 6B:
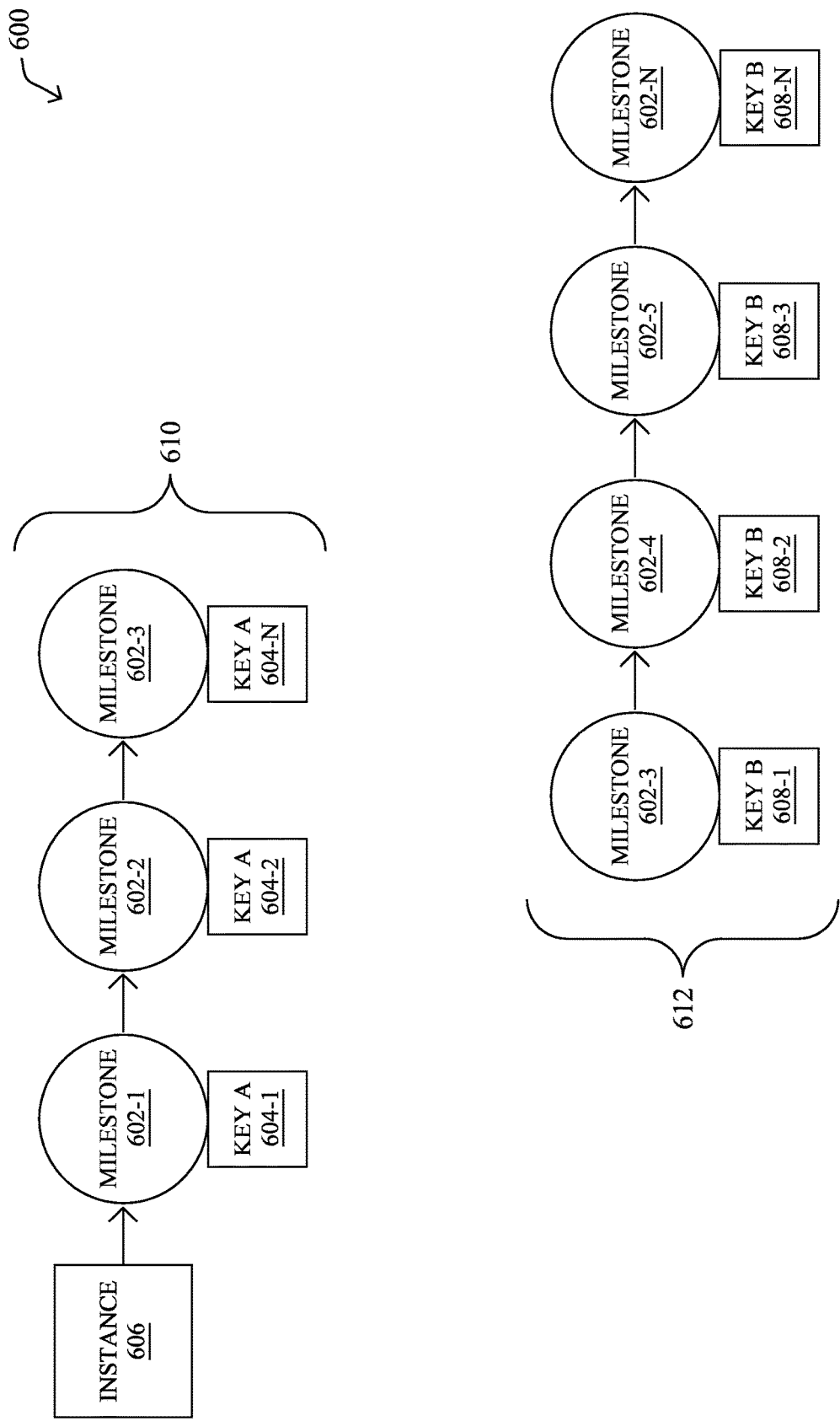

Operationally, FIGS. 6A-6B illustrate an example of a process 600 with key transitions monitored by key-based complex process monitoring, in accordance with one or more embodiments described herein. Execution of a workflow instance 606 of process 600 across milestones 602 (e.g., 602-1 . . . 602-N) may be tracked using a key that can differentiate a particular workflow instance from other instances of the process.

For example, process 600 may be an e-commerce shopping and checkout business process. In such an example, a first milestone 602-1 may be a user accessing a landing page of the e-commerce platform. The second milestone 602-2 may be the user browsing product offerings listed by the e-commerce platform. The third milestone 602-3 may be a user login to the e-commerce platform. The fourth milestone 602-4 might be the user adding an item listed for sale on the e-commerce platform to their cart. The fifth milestone 602-5 may include the user adding their payment information. The sixth milestone 602-N might be the user completing the checkout process by submitting the order and the payment information for processing. The multiple milestones linked together may comprise an end-to-end holistic representation of the various stages of workflow execution for process 600.

Each of the milestones 602 of process 600 may be associated with a key that can be used to identify and track the end-to-end workflow execution of that milestone. However, process 600 is a complex process which does not have a single key that can be utilized across all the milestones 602. Therefore, execution of a workflow instance 606 cannot be tracked end-to-end across all the milestones 602 of the process 600 using a single key. Rather, some of the milestones (e.g., first milestone 602-1, second milestone 602-2, third milestone 602-3) of process 600 have a first key 604 (e.g., 604-1 . . . 604-N) as their primary key while other milestones (e.g., third milestone 602-3, fourth milestone 602-4, fifth milestone 602-5, sixth milestone 602-N) of process 600 have a second key 608 (e.g., 608-1 . . . 608-N) that can be used as their primary key and/or as an alternate key. In other words, process 600 involves a key transition between the two groups of milestones.

Returning to the e-commerce shopping and checkout business process example, the first milestone 602-1, second milestone 602-2, and/or third milestone 602-3 may be configured to use a deviceID of the device driving the workflow instance 606 as their primary key (e.g., first key 604) while the third milestone 602-3, fourth milestone 602-4, fifth milestone 602-5, and sixth milestone 602-N may be configured to use a sessionID as their primary and/or transitional key (e.g., second key 608). Therefore, neither the first key 604 nor the second key 608 alone can be used to track execution of workflow instance 606 end-to-end across all the milestones 602 for process 600. Instead, the process transitions from the first key 604 as the primary key to the second key 608 as the primary key at and/or after the third milestone 602-3.

Since process 600 has two groups of milestones with each group having its own key, sometimes the process 600 may be split into two sub-processes (e.g., first process 610 and second process 612) for application monitoring purposes. However, in addition to introducing process management complexities that are too complicated to reliably resolve with manual management, fracturing the processes into the sub-processes destroys the ability to achieve holistic end-to-end analytics for the entire process 600.

Application performance data monitoring utilities configured with the functionality described herein that facilitates monitoring of end-to-end monitoring with key transitions can prevent this type of detrimental process fracturing. This functionality may, as described in greater detail below, be implemented via a backend capturing events corresponding to each milestone which can be joined and used for metric calculation by the backend. In this manner, a complex process with one or more primary key transitions can be supported with a single process definition.

Figure 7:
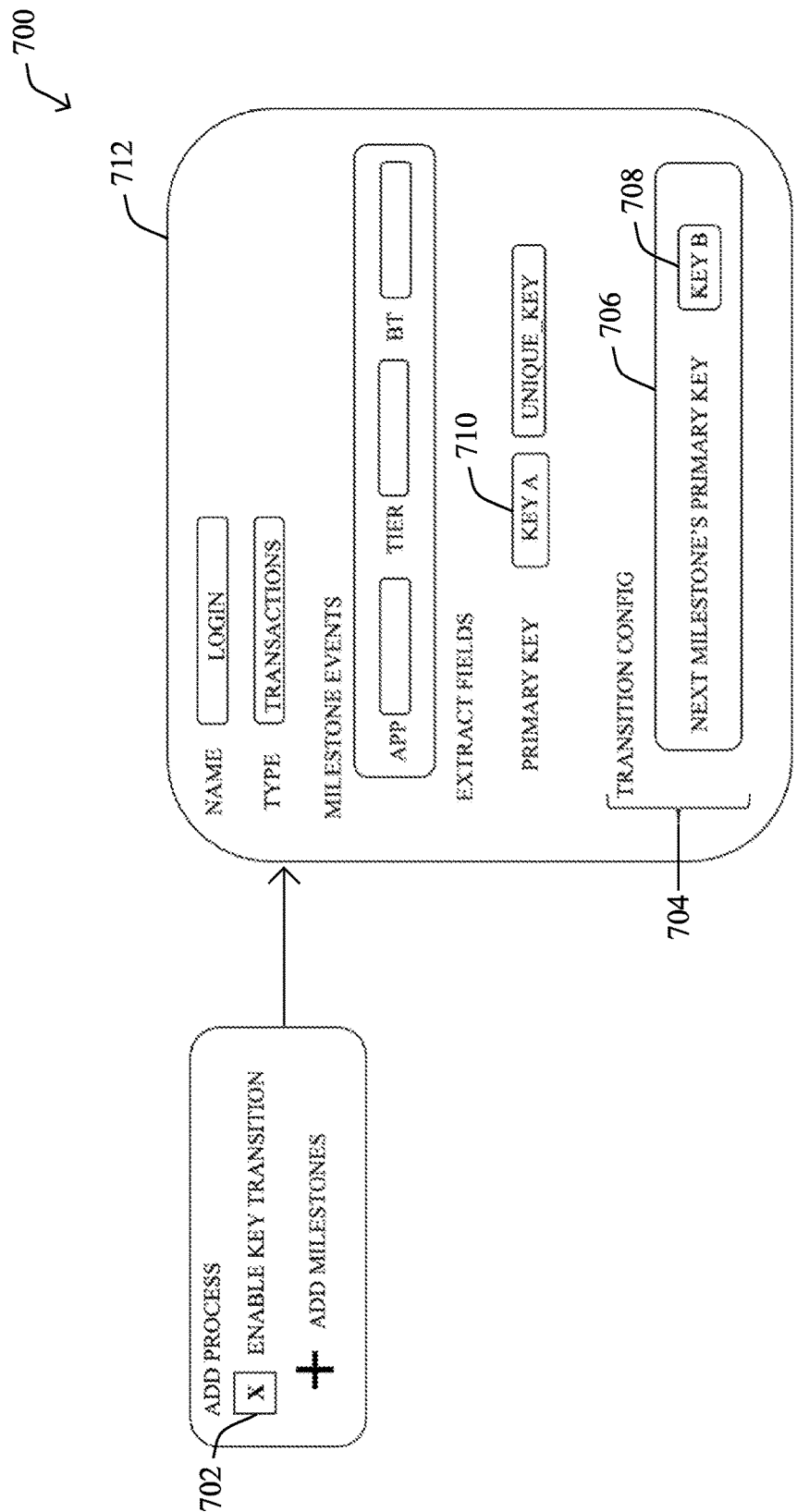
FIG. 7 illustrates an example of a process definition for processes with key transitions.

FIG. 7 illustrates an example of a process definition 700 for processes with one or more key transitions, in accordance with one or more embodiments described herein. The process definition 700 may include a configurable definition template with selectable and/or configurable options that may be exposed to an end user via a user interface. The process definition 700 may be configured by an end user in setting up monitoring for the process by an application performance monitoring platform (e.g., observability intelligence platform 300 of FIG. 3).

The process definition 700 may include a user interface flag 702. The user interface flag 702 may be selectable by a user to indicate that the process being defined will involve key transitions and/or should have key transition support operating during monitoring. When selected, the user interface flag 702 may indicate that the process being monitored will have key transitions and/or any key transitions should be not be used to split the process apart, but rather the process should be monitored seamlessly and holistically across the key transitions according to the present disclosure.

When the user interface flag 702 is selected, a transition configuration 704 may be added and/or enabled for a milestone in the process definition 700. The transition configuration 704 may map a key transition for that milestone. For instance, transition configuration 704 may include key transition definition 706. The key transition definition 706 may specify a second primary key 708 that will be the primary key at the next milestone instead of the first primary key 710 at the current milestone (e.g., a transitional milestone where both keys are supported).

For example, process definition 700 may include a milestone definition 712 for a milestone such as the user login to the e-commerce platform. The milestone definition 712 may include a first primary key associated with the user login to the e-commerce platform milestone. The milestone definition 712 may, based on the user interface flag 702 selection, include a transition configuration 704 with a key transition definition 706 that maps the key transition from the first primary key 710 to the second primary key 708 that is the primary key for the next milestone (e.g., an adding an item listed for sale on the e-commerce platform to their cart milestone).

A user may complete configuration of the application monitoring process by saving a completed process definition. Once the process definition 700 has been completed and/or saved, an application performance monitoring platform's processing backend may begin to capture events. The captured events may correspond with each milestone specified in the process definition 700.

Figure 8:
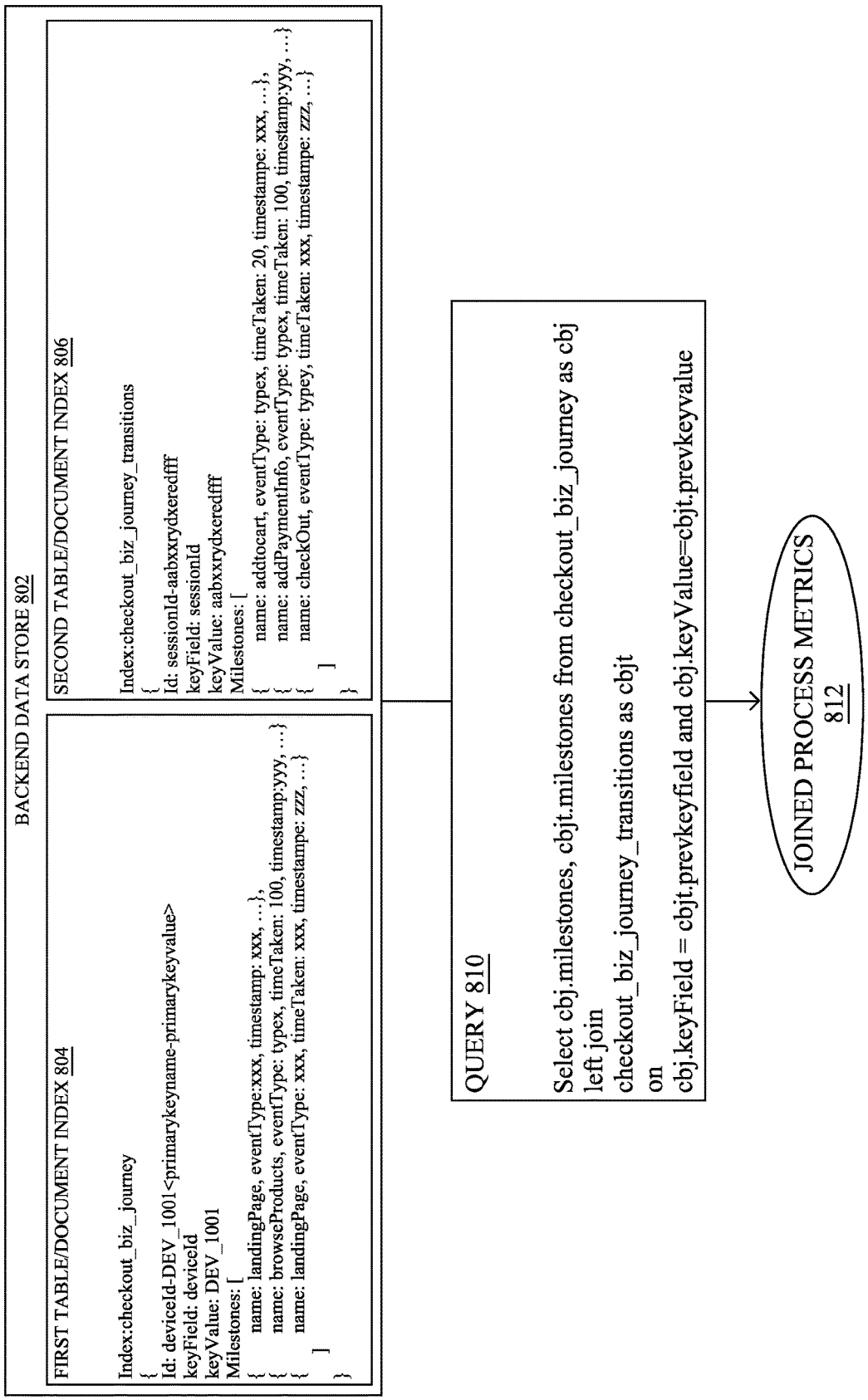
FIG. 8 illustrates an example of an architecture for capturing and reporting events across process milestones with key transitions.

FIG. 8 illustrates an example of an architecture 800 for capturing and reporting events across process milestones with key transitions, in accordance with one or more embodiments described herein. The captured events may include data captured from execution of a workflow instance of a process at each milestone of that process. The captured events may be captured by a processing backend of an application performance monitoring platform (observability intelligence platform 300 of FIG. 3).

In architecture 800, captured events associated with milestones that share the same key may be stored in a single table and/or document index in a backend data store 802 of the application monitoring platform. In the example of the e-commerce shopping and checkout business process: the first milestone (user device at the landing page), second milestone (user device browsing products), and/or third milestone (user device login) are configured to use a deviceID of the user device as their primary key; the third milestone is able to transition to using a sessionID key; and the fourth milestone (user adds product to cart), fifth milestone (user adds payment information), and sixth milestone (user checkout) are be configured to use the sessionID as their primary key. In this example, the events captured with respect to the first milestone, second milestone, and third milestone are saved in a first table/document index 804 in the backend data store 802 since they share the common sessionID key. Meanwhile, the events captured with respect to the fourth milestone, fifth milestone, and sixth milestone are saved in a second table/document index 806 in the backend data store 802 since they share the common deviceID key.

In various embodiments, despite being stored in their respective table/document indexes, the key transitions can be handled as a single process from the end user side. The application performance monitoring platform may seamlessly join and holistically analyze the segmented data as one. That is, the application performance data and analytics provided by the application performance monitoring platform may be based on data from across the entire process and/or any of the milestones regardless of their associated key.

For instance, query 810 may cause the application performance monitoring platform to join together and/or analyze the data from the various individual tables/document indices. For example, in response to query 810 the application performance monitoring platform may calculate end-to-end process metrics across the milestones of the process (regardless of key transitions) by joining and/or analyzing the data between the first table/document index 804 and the second table/document index 806. The joined process metrics 812 and/or analysis thereof may then be presented to an end user to provide a holistic end-to-end analysis of application performance in the process.

In additional embodiments, the key transition scenario may be similarly addressed in a stream processor configuration as the incoming real-time events are processed. For example, for process definitions with key transition configurations, the stream processor may keep all incoming events associated with those processes in its in-memory state store. Then, once all the milestone events (regardless of their key) are received or after a configured time interval has passed, all associated events may be merged and flushed and/or stored into the backend data store 802.

These mechanisms facilitate monitoring of complex process workflows with multiple keys by building key transition support into application performance monitoring platforms. This enables users to correctly represent and monitor and entire workflow without having to split it into multiple processes and without the involvement of error-prone manual tracking and cross sub-process calculation strategies. Instead, users can provide a key transition configuration upfront that automatically facilitates the monitoring, capturing, storing, joining, analyzing, and/or reporting of event data from across process milestones having different primary keys. Therefore, complex processes with key transitions can now be accurately monitored, their computing resource and/or network resource consumption can be reduced, security risks and bugs can be identified and addressed more rapidly, and the operation of the underlying networks and devices are improved.

Figure 9:
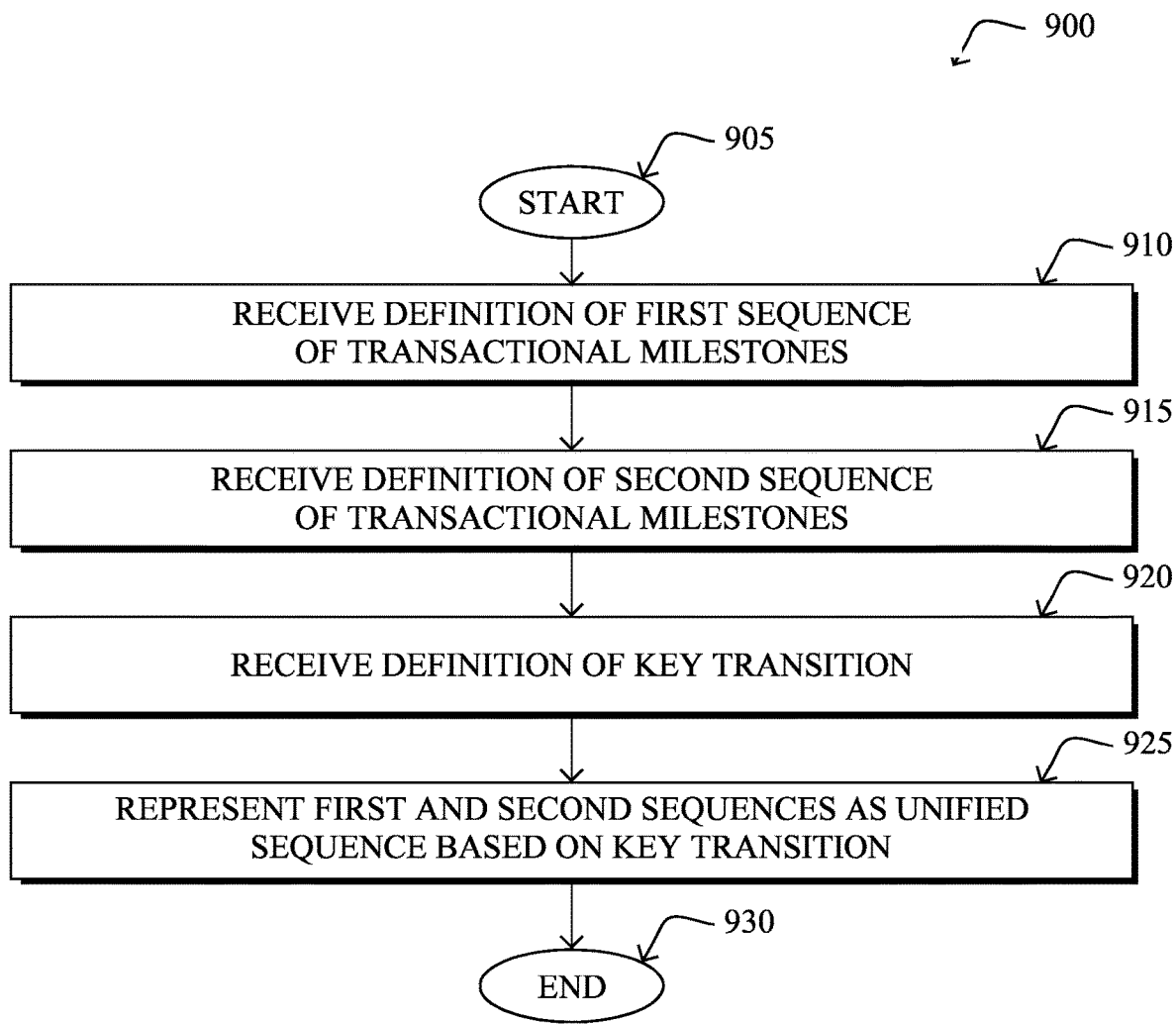
FIG. 9 illustrates an example simplified procedure for key-based complex process monitoring in accordance with one or more embodiments described herein.

In closing, FIG. 9 illustrates an example simplified procedure for key-based complex process monitoring in accordance with one or more embodiments described herein. For example, a non-generic, specifically configured device (e.g., device 200) may perform procedure 900 by executing stored instructions (e.g., monitoring process 248). The procedure 900 may start at step 905, and continues to step 910, where, as described in greater detail above, receive, via a user interface, definition of a first sequence of transactional milestones performed by users of an online application and identified using a first type of identifier. In some embodiments, the first type of identifier is a device identifier or a session identifier associated with the particular user.

At step 915, as detailed above, the device may receive, via the user interface, definition of a second sequence of transactional milestones performed by users of the online application and identified using a second type of identifier. In some embodiments, the second type of identifier is a device identifier or a session identifier associated with the particular user.

At step 920, the device may receive, via the user interface, definition of a key transition associated with at least one transactional milestone in the first sequence of transactional milestones or second sequence of transactional milestones that links the first type of identifier with the second type of identifier, as described in greater detail above. In various embodiments, the at least one transactional milestone comprises a login event.

At step 925, as detailed above, the device may represent, using the key transition, performance of the first sequence of transactional milestones and the second sequence of transactional milestones by a particular user of the online application as a unified sequence. In some embodiments, the device may also generate display data based on the unified sequence and provide the display data for display by the user interface. In one embodiment, the display data comprises performance metrics associated with the online application. In various embodiments, the device may also receive data captured by one or more agents indicative of the particular user performing the first sequence of transactional milestones and the second sequence of transactional milestones. In one embodiment, the one or more agents instrument the online application to capture the data. In another embodiment, the data is indicative of an amount of time associated with each transactional milestone in the unified sequence. In a further embodiment, the device may also configure a stream processor associated with the online application with the key transition to record when users of the online application perform the unified sequence.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for key-based complex process monitoring. Previously unmonitorable workflows involving repeating keys and/or key transitions are now able to be holistically monitored in an end-to-end manner when utilizing these techniques. The ability to monitor complex workflows plays a crucial role in enhancing computer and network performance. By implementing comprehensive monitoring systems, organizations can gain real-time insights into their workflows, allowing them to identify bottlenecks, inefficiencies, and potential points of failure. This monitoring capability enables proactive management and optimization of resources, ensuring smooth operations and improved overall performance. Through continuous monitoring, administrators can analyze system metrics, network traffic, and resource utilization, enabling them to make informed decisions regarding capacity planning, load balancing, and resource allocation. This proactive approach minimizes downtime, enhances system responsiveness, and optimizes resource usage, resulting in increased productivity and efficiency. Furthermore, monitoring complex workflows allows for the identification of potential security vulnerabilities, enabling swift action to mitigate risks and protect against cyber threats. Therefore, the ability to monitor complex workflows empowers organizations to fine-tune their systems, optimize network performance, and enhance overall productivity and security.

Illustratively, the techniques described herein may be performed by hardware, software, and/or firmware, such as in accordance with the illustrative monitoring process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing monitoring process 248.

According to the embodiments herein, an illustrative method herein may comprise: INDEPENDENT CLAIM VERBATIM.

In one embodiment, DEPENDENT CLAIMS (one sentence for each, same paragraph).

According to the embodiments herein, an illustrative tangible, non-transitory, computer-readable medium herein may have computer-executable instructions stored thereon that, when executed by a processor on a computer, may cause the computer to perform a method comprising: CLAIM.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: CLAIM.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   receiving, at a device and via a user interface, definition of a first sequence of transactional milestones performed by users of an online application and identified using a first type of identifier;
   receiving, at the device and via the user interface, definition of a second sequence of transactional milestones performed by users of the online application and identified using a second type of identifier;
   receiving, at the device and via the user interface, definition of a key transition associated with at least one transactional milestone in the first sequence of transactional milestones or second sequence of transactional milestones that links the first type of identifier with the second type of identifier; and
   representing, by the device and using the key transition, performance of the first sequence of transactional milestones and the second sequence of transactional milestones by a particular user of the online application as a unified sequence.

2. The method as in claim 1, wherein the first type of identifier is a device identifier or a session identifier associated with the particular user.

3. The method as in claim 1, wherein the second type of identifier is a device identifier or a session identifier associated with the particular user.

4. The method as in claim 1, wherein the at least one transactional milestone comprises a login event.

5. The method as in claim 1, further comprising:
   generating, by the device, display data based on the unified sequence; and
   providing, by the device, the display data for display by the user interface.

6. The method as in claim 5, wherein the display data comprises performance metrics associated with the online application.

7. The method as in claim 1, wherein representing, using the key transition, performance of the first sequence of transactional milestones and the second sequence of transactional milestones by a particular user of the online application as the unified sequence comprises:
   receiving, at the device, data captured by one or more agents indicative of the particular user performing the first sequence of transactional milestones and the second sequence of transactional milestones.

8. The method as in claim 7, wherein the one or more agents instrument the online application to capture the data.

9. The method as in claim 7, wherein the data is indicative of an amount of time associated with each transactional milestone in the unified sequence.

10. The method as in claim 1, further comprising:
    configuring, by the device, a stream processor associated with the online application with the key transition to record when users of the online application perform the unified sequence.

11. An apparatus, comprising:
    one or more network interfaces;
    a processor coupled to the one or more network interfaces and configured to execute one or more processes; and
    a memory configured to store a process that is executable by the processor, the process when executed configured to:
       receive, via a user interface, definition of a first sequence of transactional milestones performed by users of an online application and identified using a first type of identifier;
       receive, via the user interface, definition of a second sequence of transactional milestones performed by users of the online application and identified using a second type of identifier;
       receive, via the user interface, definition of a key transition associated with at least one transactional milestone in the first sequence of transactional milestones or second sequence of transactional milestones that links the first type of identifier with the second type of identifier; and
       represent, using the key transition, performance of the first sequence of transactional milestones and the second sequence of transactional milestones by a particular user of the online application as a unified sequence.

12. The apparatus as in claim 11, wherein the first type of identifier is a device identifier or a session identifier associated with the particular user.

13. The apparatus as in claim 11, wherein the second type of identifier is a device identifier or a session identifier associated with the particular user.

14. The apparatus as in claim 11, wherein the at least one transactional milestone comprises a login event.

15. The apparatus as in claim 11, wherein the process when executed is further configured to:
    generate display data based on the unified sequence; and
    provide the display data for display by the user interface.

16. The apparatus as in claim 15, wherein the display data comprises performance metrics associated with the online application.

17. The apparatus as in claim 11, wherein the apparatus represents, using the key transition, performance of the first sequence of transactional milestones and the second sequence of transactional milestones by a particular user of the online application as the unified sequence by:
    receiving data captured by one or more agents indicative of the particular user performing the first sequence of transactional milestones and the second sequence of transactional milestones.

18. The apparatus as in claim 17, wherein the one or more agents instrument the online application to capture the data.

19. The apparatus as in claim 17, wherein the data is indicative of an amount of time associated with each transactional milestone in the unified sequence.

20. A tangible, non-transitory, computer-readable medium storing program instructions that cause a device to execute a process comprising:

receiving, at the device and via a user interface, definition of a first sequence of transactional milestones performed by users of an online application and identified using a first type of identifier;

receiving, at the device and via the user interface, definition of a second sequence of transactional milestones performed by users of the online application and identified using a second type of identifier;

receiving, at the device and via the user interface, definition of a key transition associated with at least one transactional milestone in the first sequence of transactional milestones or second sequence of transactional milestones that links the first type of identifier with the second type of identifier; and representing, by the device and using the key transition, performance of the first sequence of transactional milestones and the second sequence of transactional milestones by a particular user of the online application as a unified sequence.

* * * * *